(No Model.)
P. DUFFY.
NUT ARBOR.
No. 278,896.     Patented June 5, 1883.
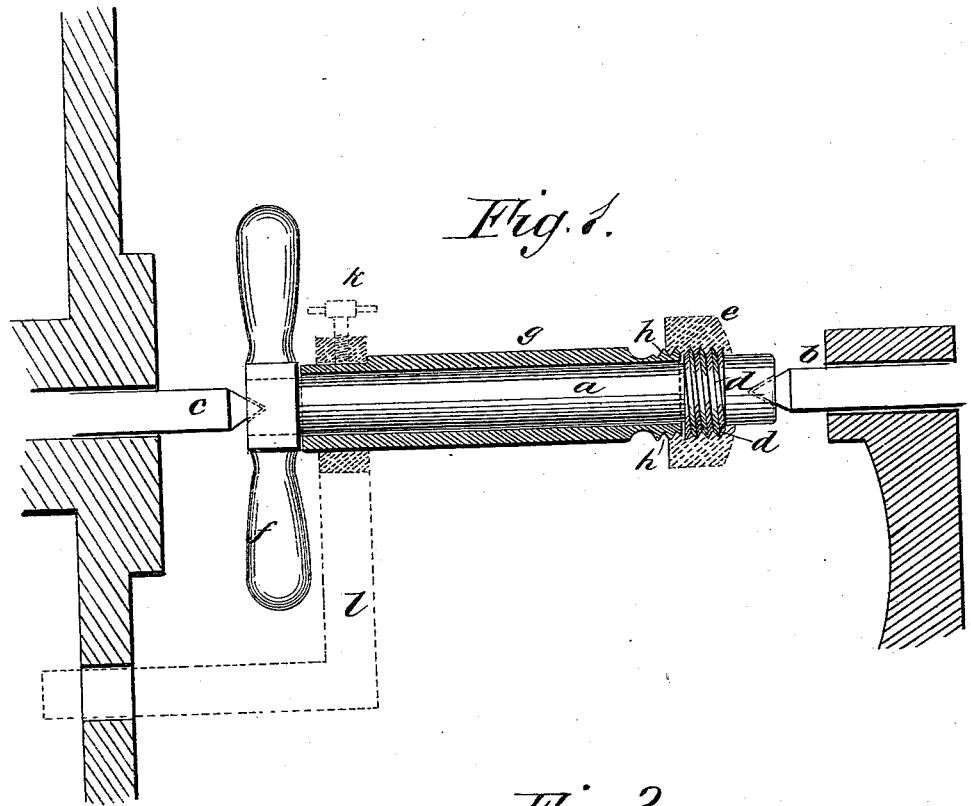
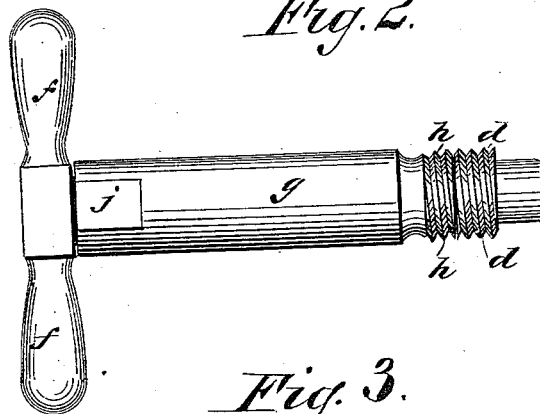
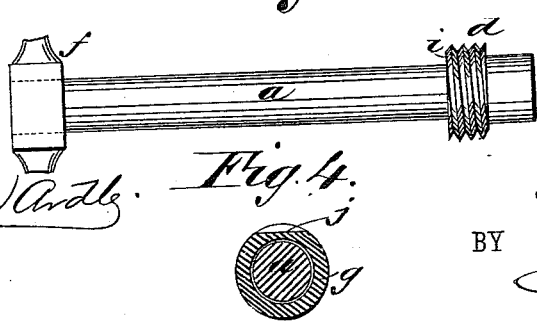
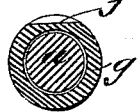
WITNESSES:
Francis McArdle
C. Sedgwick
INVENTOR:
P. Duffy
BY Munn & Co
ATTORNEYS.
N. PETERS, Photo-Lithographer, Washington, D. C.

UNITED STATES PATENT OFFICE.

PATRICK DUFFY, OF NEW BEDFORD, MASSACHUSETTS, ASSIGNOR TO HIMSELF AND JAMES F. POWERS, OF SAME PLACE.

NUT-ARBOR.

SPECIFICATION forming part of Letters Patent No. 278,896, dated June 5, 1883.

Application filed March 6, 1883. (No model.)

*To all whom it may concern:*

Be it known that I, PATRICK DUFFY, of New Bedford, Bristol county, Massachusetts, have invented a new and Improved Nut-Arbor, of which the following is a full, clear, and exact description.

My invention consists of a rod with center sockets in the ends to fit in the lathe-centers, and a sleeve surrounding the rod the greater portion of its length, the rod and the sleeve each having part of the screw-threads by which the nuts to be faced are screwed on, so that the threads of one part may be shifted with relation to the threads of the other part after the nut is screwed on, and one will check against the other, and thus hold the nuts by the threads alone to be faced, which will insure the facing of nuts true to the screw-threads, and thus will avoid the imperfect work that results from the sides of the nuts being screwed against a shoulder of the mandrel when not true to begin with, as hereinafter fully described.

Reference is to be had to the accompanying drawings, forming part of this specification, in which similar letters of reference indicate corresponding parts in all the figures.

Figure is a longitudinal section of the sleeve and side view of the rod of my improved nut-arbor, which is represented in the centers of a lathe, of which the face-plate and the tail-stock are sectioned. Fig. 2 is a side elevation of the nut-arbor. Fig. 3 is a side elevation of the center-rod, and Fig. 4 is a cross-section of the center-rod and the sleeve.

$a$ represents a center-rod, which is center punched or bored in the ends to run on the lathe-centers $b$ $c$, and it has a part, $d$, of the screw on which the nut $e$ is to be carried to be faced. It also has a handle, $f$, for convenience in checking the nut after being screwed on.

$g$ represents the sleeve, fitted on the rod, and having the other part, $h$, of the screw on one end, which end abuts against the shoulder $i$ of part $d$ on the rod, forming, when properly set with reference thereto, a continuous screw, on which the nut will run readily to be fixed in its position for facing, and also forming a check by turning either part forward or backward after the nut is on. Such turning binds the nut fast by its threads alone, and thus insures the facing of the nuts true to the threads, which cannot always be done when the nut is screwed against a collar, because if the nut is not true to the threads it will bind at one side on the collar and be thrust out of line. The sleeve $g$ has a flat, $j$, for the screw $k$ of the lathe-dog $l$.

The dog serves for a handle to the sleeve, with which and with the handle $f$ of the rod the sleeve and the rod may be strained with sufficient force to effectually check the nuts for security against being turned by the lathe-tool.

Having thus described my invention, I claim as new and desire to secure by Letters Patent—

The combination, in a nut-arbor, of the center-rod $a$ and the sleeve $g$, each having a portion of the thread, $d$ $h$, for receiving the nut to be turned, and forming checks to bind and hold the nut fast by the threads, substantially as described.

PATRICK DUFFY.

Witnesses:
THOMAS J. MURPHY,
JOHN H. LOWE.